United States Patent
Zhang

(10) Patent No.: US 10,970,942 B2
(45) Date of Patent: Apr. 6, 2021

(54) FOG DATA AGENT FOR CONNECTED CARS

(71) Applicant: Wistron AiEDGE Corporation, San Jose, CA (US)

(72) Inventor: Junshan Zhang, Tempe, AZ (US)

(73) Assignee: Wistron Aiedge Corporation, San Jose, CA (US)

( * ) Notice: Subject to any disclaimer, the term of this patent is extended or adjusted under 35 U.S.C. 154(b) by 0 days.

(21) Appl. No.: 15/980,718

(22) Filed: May 15, 2018

(65) Prior Publication Data

US 2018/0336741 A1 Nov. 22, 2018

Related U.S. Application Data

(60) Provisional application No. 62/507,175, filed on May 16, 2017.

(51) Int. Cl.
| | | |
|---|---|---|
| *B60Q 1/00* | (2006.01) | |
| *G07C 5/00* | (2006.01) | |
| *H04W 72/10* | (2009.01) | |
| *H04W 4/44* | (2018.01) | |
| *H04W 4/80* | (2018.01) | |
| *G07C 5/08* | (2006.01) | |
| *H04W 4/38* | (2018.01) | |

(52) U.S. Cl.
CPC .............. *G07C 5/008* (2013.01); *H04W 4/44* (2018.02); *H04W 72/10* (2013.01); *G07C 5/0825* (2013.01); *H04W 4/38* (2018.02); *H04W 4/80* (2018.02)

(58) Field of Classification Search
CPC .......... G07C 5/008; H04W 4/44; H04W 72/10
See application file for complete search history.

(56) References Cited

U.S. PATENT DOCUMENTS

| | | | |
|---|---|---|---|
| 7,484,008 B1 * | 1/2009 | Gelvin | G06F 15/173 709/249 |
| 8,718,797 B1 * | 5/2014 | Addepalli | H04L 29/06578 700/17 |
| 8,843,178 B1 | 9/2014 | Wong | |

(Continued)

OTHER PUBLICATIONS

International Search Report and Written Opinion received in corresponding Patent Cooperation Treaty Application No. PCT/US17/018254, dated May 5, 2017, 11 pages.

(Continued)

*Primary Examiner* — Phung Nguyen
(74) *Attorney, Agent, or Firm* — Wei Wei Jeang; Grable Martin Fulton PLLC

(57) ABSTRACT

A fog data agent for a connected car includes a connector configured to couple to an on-board diagnostic port of the connected car, a microprocessor, a wireless communication interface coupled to the microprocessor, a cellular communication interface coupled to the microprocessor, a data storage device coupled to the microprocessor, and logic configured to receive data from the on-board diagnostic port, analyzes the data in real-time, and establish a bi-directional communication channel with a remote server via at least one of the wireless communication interface and the cellular communication interface to transmit a subset of the analyzed data to the remote server in response to the data analysis.

19 Claims, 2 Drawing Sheets

(56) References Cited

U.S. PATENT DOCUMENTS

| | | |
|---|---|---|
| 9,473,987 B1 | 10/2016 | Hicks |
| 9,596,287 B2 * | 3/2017 | Rybak .................... G07C 5/008 |
| 2007/0013785 A1 | 1/2007 | Kinoshita et al. |
| 2009/0207013 A1 | 8/2009 | Ayed |
| 2010/0231714 A1 | 9/2010 | Flores et al. |
| 2011/0130112 A1 | 6/2011 | Saigh et al. |
| 2012/0087257 A1 | 4/2012 | Larsson et al. |
| 2013/0237234 A1 | 9/2013 | Jiao et al. |
| 2014/0003262 A1 | 1/2014 | He et al. |
| 2014/0241265 A1 | 8/2014 | Pragada et al. |
| 2015/0117409 A1 * | 4/2015 | Ghai ................... H04L 41/0886 370/331 |
| 2015/0181460 A1 | 6/2015 | Subramanian et al. |
| 2015/0334724 A1 | 11/2015 | Faccin et al. |
| 2015/0349881 A1 | 12/2015 | Byers |
| 2015/0358924 A1 | 12/2015 | Papasakellariou |
| 2015/0375695 A1 * | 12/2015 | Grimm ................ B60R 16/023 701/1 |
| 2016/0057809 A1 | 2/2016 | Gallagher et al. |
| 2016/0105305 A1 | 4/2016 | Pignataro et al. |
| 2016/0110722 A1 * | 4/2016 | Reddy .................. G06Q 30/012 705/302 |
| 2016/0182639 A1 | 6/2016 | Hong et al. |
| 2016/0300227 A1 | 10/2016 | Subhedar et al. |
| 2016/0357524 A1 | 12/2016 | Maluf et al. |

OTHER PUBLICATIONS

International Search Report and Written Opinion received in corresponding Patent Cooperation Treaty Application No. PCT/US18/012723, dated Mar. 29, 2018, 14 pages.

Kim, Jonghyuk, et al., "An Empirical Study on Real-Time Data Analytics for Connected Cars: Sensor-Based Applications for Smart Cars", International Journal of Distributed Sensor Networks, vol. 14(I), Jan. 27, 2018.

Rudolph, Gert, et al., "Three Sensor Types Drive Autonomous Vehicles", Fierce Electronics, Nov. 10, 2017.

Smon, Todd, "Massive Autonomous Vehicle Sensor Data: What Does It Mean?", Datanami, May 15, 2017.

\* cited by examiner

| ROUTING MODULE 22 | FOG NETWORK MANAGING SENSOR/MICROPROCESSOR 24 | MULTI-SIM BONDING BOOSTING APP 26 |
|---|---|---|
| DSRC COMM 28 | WiFi 30 | BLUETOOTH 32 |
| SENSOR DATA DATABASE 34 | DATA ANALYTICS 36 | DATA VISUALIZATION 38 |
| INFORMATION & CONTENT REPOSITORY 40 | CONTENT DISTRIBUTION 42 | DELAY-TOLERANT NETWORK 44 |

FOG DATA AGENT FOR CONNECTED CARS

RELATED APPLICATION

This non-provisional patent application claims the benefit of U.S. Provisional Patent Application Ser. No. 62/507,175 filed May 16, 2017, which is incorporated herein by reference.

FIELD

The present disclosure relates to fog networks and particularly to a fog data agent for connected cars.

BACKGROUND

Recent years have witnessed a significant increase of the data volume in many industries, including telecom, social networks, online retail, banking, airline, etc. Many companies, such as social networks and telecom, have been using the data they gather from customers and their connected devices to improve products, services, and marketing. The auto industry, however, has not had the frequent digital touch points with its consumers and falls far behind. Although many contemporary car models offer dashboard screens that allow drivers to manage various in-car functions through a digital interface, the current digital features are non-intuitive, costly, and hard to use, compared to a smartphone interface, for example. It is further observed that most automakers do not have the capability needed to create a content-focused business or maintain it with the speed and flexibility of a true digital provider.

Connected cars, which carry embedded mobile broadband chips and on-board computers, will generate and collect approximately twenty-five gigabytes of data every hour. That's equal to about a dozen HD movies and exceeds the storage capacity of most smartphones today. These data include a wide range of information about the car and its driver: routes, speed, fuel level, gas consumption, status of components and equipment, wear and tear on its components, road conditions, what the driver is listening to, which app the driver is using, what is the trip destination, etc. Vehicles today have about 40 microprocessors and dozens of sensors that collect telematics and driver behavior data, and that data can be analyzed in real-time to keep the vehicle's performance, efficiency, and safety in check. It also provides vital feedback for cities and states about traffic volume and roadway design.

DETAILED DESCRIPTION

The very notion of the "car" is being revolutionized. Connected cars (including self-driving cars) are those with Internet access and with a variety of sensors, which thus enable the cars to sense the proximal physical environment, send and receive signals, and interact with other vehicles or entities. The connected cars will emerge as the "fifth screen" in our everyday life, after movies, televisions, personal computers, and mobile phones. The industry that will spring up to support the connected car will build its own ecosystem in the next 10-15 years, and will likely rival the growth rate of the smartphone industry in its infancy.

The auto industry has not had the luxury to gather data from its customers and their connected devices to improve services, develop new product offerings, and market more effectively. The Fog Data Agent for Connected Cars (FDACC) described herein provides a two-way channel between the consumer and car manufacturers/dealers in a continuous/periodic manner, through either WiFi or cellular connections, which in turn offers the consumer frequent digital touch points, including digital service usage and vehicle status and conditions. The FDACC enables car manufacturers and/or car dealers to collect a massive amount of car data from many consumers, in a continuous manner when WiFi is available, and periodic manner otherwise. The market potential of the collected data is invaluable. The FDACC 10 offers data services ranging from data collection to data processing to data communications, which can be used for a variety of functions, including preventive/predictive control actions and maintenance, vehicle software upgrade, optimized marketing, upselling, and making data available to third parties.

Figures 1, 2:
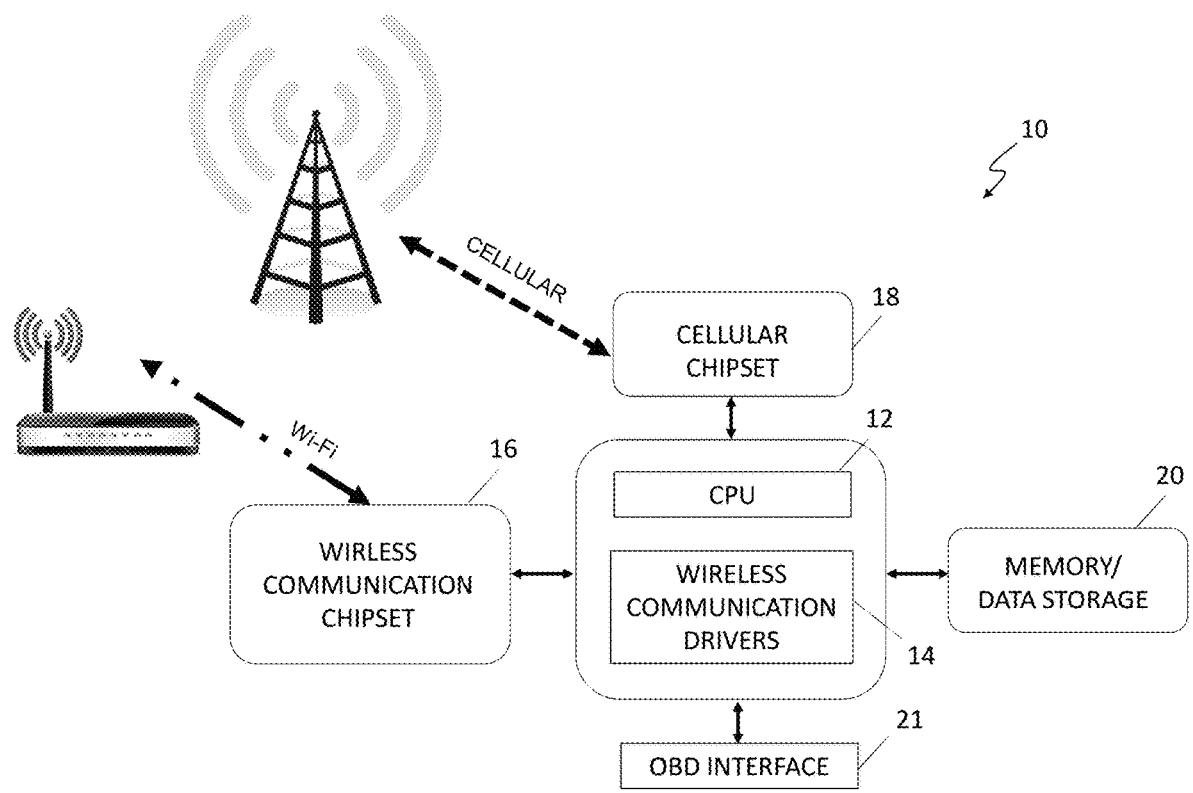
FIG. 1 is a simplified block diagram of an exemplary embodiment of a fog data agent for connected cars according to the teachings of the present disclosure.
FIG. 2 is a table illustrating fog data agents for connected cars.

The FDACC (Fog Data Agent for Connected Cars) 10 has built-in capabilities for computing, communication, and storage by integrating connectivity and data analytics solutions. FIG. 1 is a simplified block diagram of the basic building blocks of the FDACC 10. The FDAACC 10 includes a CPU 12, wireless communication drivers 14, a wireless communication chipset/circuitry 16, a cellular chip/circuitry 18, memory/data storage devices 20, and an interface 21 to a vehicular on-board diagnosis (OBD) II port. The FDACC 10 is configured to receive various types of data collected by sensors (e.g., tire pressure, engine coolant temperature, engine speed, throttle position, cam position, fuel pressure, fuel level, fuel temperature, air flow, air-fuel radio, hall effect, vehicle speed, airbag, automatic transmission speed, manifold absolute pressure, oil level, oil pressure, spark knock monitoring, oxygen, navigational and GPS, outside temperature, inside temperature, radars, LiDARs (Light Detecting And Ranging), imaging and video cameras, etc.) onboard a vehicle, and depending on the type and nature of the data, transmit the data promptly to the cloud via the wireless communication chipset 16 and/or the cellular chipset 18, store the data and transmit when certain conditions are met, such as when there is sufficient bandwidth or when there is WiFi coverage, or store the data in the memory/data storage devices 20 onboard.

FIG. 2 is a table that lists exemplary logic/functionalities for the FDACC 10, including, for example, a routing module 22, fog network managing sensor/microprocessor 24, boosting apps for multi-sim bonding 26, dedicated short range communications (DSR Comm) 28, WiFi 30, Bluetooth 32, database for storing collected sensor data 34, data analytics module 36, data visualization 38, information and content repository 40, content distribution module 42, and delay-tolerant network module 44. These twelve modules of the FDACC 10 offer a rich set of functionalities, ranging from wireless communications to content delivery, and to computing and storage.

The wireless communication functionalities of the FDACC 10 are performed by the DSR Comm module 28, WiFi module 30, Bluetooth module 32, and the boosting app 26 for communication between the FDACC 10 and the car manufacturers, car dealers, and other entities over the cloud. The FDACC 10 may further include, additionally or alternatively, other types of wireless interfaces and functionality now known or later developed.

The DSR Comm module 28 is capable of carrying out wireless communication in the 5.9 GHz band, which is specifically designed for automotive use using a corresponding set of protocols and standards. The DSC standards developed by the European Committee for Standardization (CEN) in cooperation with the International Organization for Standardization (ISO) are incorporated herein by reference.

The WiFi module 30 has the functionality of transferring data to and from the FDACC 10 to the cloud over the 2.4 GHz UHF and 5.8 GHZ SHF ISM radio bands when WiFi is available. The IEEE 802.11 standard that govern WiFi is incorporated herein by reference.

The Bluetooth module 32 has the functionality to transfer data to devices proximately located to the FDACC 10. Bluetooth is an existing wireless technology standard for exchanging data over short distances (using short-wavelength UHF radio waves in the ISM band from 2.4 to 2.485 GHz) from fixed and mobile devices, and building personal area networks (PANs). The IEEE 802.15.1 maintained and managed by The Bluetooth Special Interest Group governing the Bluetooth protocols are incorporated herein by reference.

The boosting Apps for bonding multiple wireless interfaces module 26 is a software application that functions to bond or bundle the bandwidth of multiple wireless communication interfaces to achieve higher throughput and lower latency. In one embodiment of the FDAACC 10, bandwidth boosting is achieved by creating a Virtual Private Network (VPN) between two remote endpoints using available networks. There is a proxy agent that sits on top of the VPN that manages the data traffic and utilizes each of the data pipes based on the capacity available through that pipe. Each of the data transmission packet is labeled with a sequencer to track any lost packets.

The second category of functionality for the FDAACC modules is routing and contenting distribution, which includes the routing module 22, the content distribution module 42, and the delay-tolerant network module 44. The routing module 22 is a data router. The content distribution module 42 is configured to transfer information and content from the car to and from connected devices in the proximity. The delay-tolerant network module 44 is configured to enable data transfer from the FDACC 10 to and from the cloud when there is connectivity, such as when WiFi coverage is available. Delay-tolerant networking has been more recently referred to as disruption-tolerant networking, where disruption may occur due to the limits of wireless radio range, sparsity of mobile nodes, energy resources, noise, and other disruptions.

The third category of FDACC functionality is sensory data collection and content repository. On average, each vehicle today has about 40 microprocessors and many sensors that collect data about the operating condition and status of the car, driver behavior, and surrounding environment. The fog network managing sensor/microprocessor module 24 is designed to established networked communications and collect sensor data. The database module 34 is used as a repository for collected sensor data. The information and content repository module 40 is used as local storage for general information and content.

The fourth category of FDACC functionality is data processing and visualization. The data analytics module 36 is configured to process the collected data from various sources in the car and make local classifications on needed services, such as preventive/predictive control actions and maintenance and vehicle software upgrade. The data analytics module 36 may have the ability to provide intelligent decision-making by processing a variety of signals and data for, e.g., sensor data, video captures, sound captures etc. locally. It has the ability to display and generate video, graphics, sounds, light indicators, sirens, etc. in response to a decision-making process or input by a remote controlling entity. There is an ability to create scenes or workflow models based on inputs and available data using decision trees. The decision tree can be constructed based on certain input conditions, decision criteria, and decisions to be made. The business logic/rules can be automated and implemented in application software. The decision trees may be prioritized in a manner that the higher priority decision gets executed exclusively or prior to any lower priority decision. This way, either a specific action is taken or a range of actions are taken depending on the priority of the decision nodes. The data visualization module 38 is used to display or present selective content or results generated from the data analytics module 36.

Figure 3:
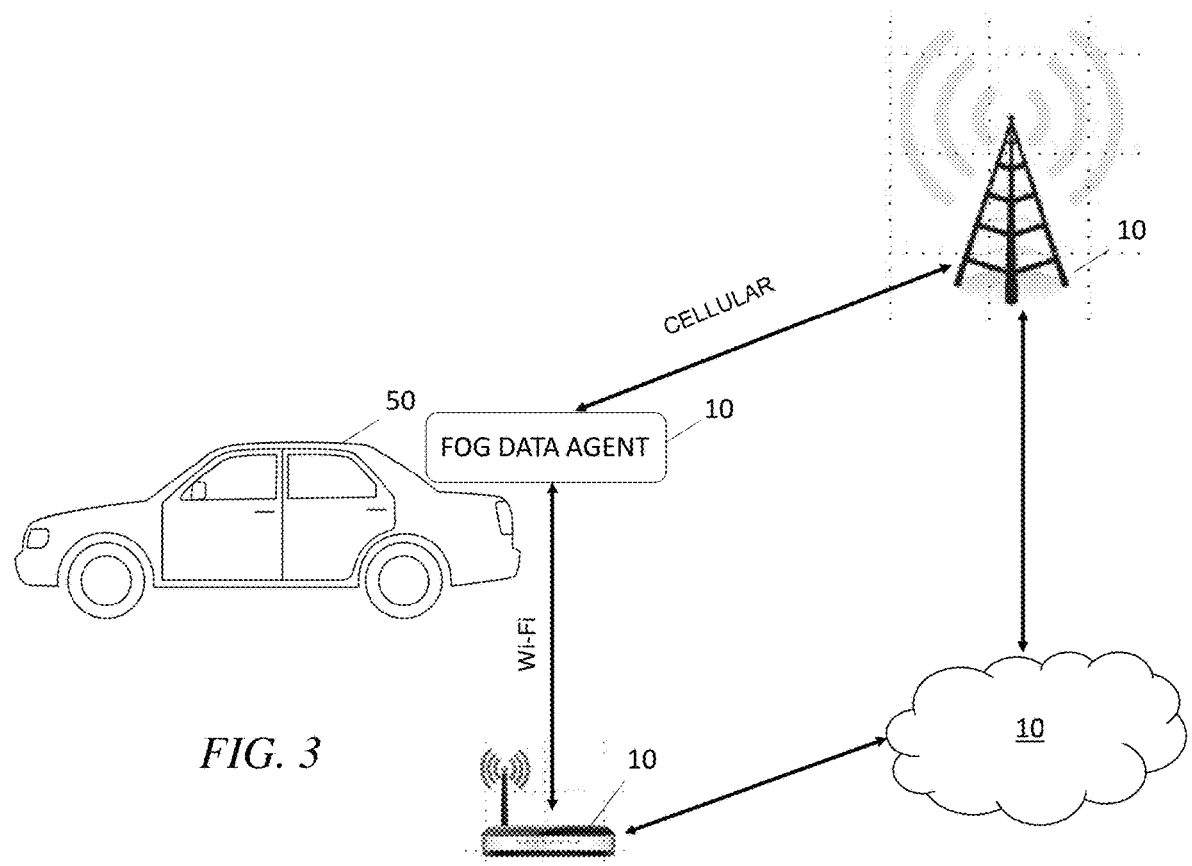
FIG. 3 is a simplified diagram illustrating functionalities of an exemplary embodiment of a fog data agent for a connected car according to the teachings of the present disclosure.

As illustrated in FIG. 3, the FDACC 10 collects data from sensors in the car 50, preferably by plugging into the on-board diagnosis (OBD) II port. All cars and light trucks built and sold in the United States after Jan. 1, 1996 are required to be equipped with an OBD II port to provide real-time data, which allow one to rapidly identify and remedy malfunctions within the vehicle. The OBD-II standard specifies the type of diagnostic connector and its pinout, the electrical signaling protocols available, and the messaging format. It also provides a candidate list of vehicle parameters to monitor along with how to encode the data for each. In 2008, all cars sold in the United States are further required to use the ISO 15765-4 signaling standard (a variant of the Controller Area Network (CAN) bus).

The FDACC 10 leverages data mining techniques to classify received sensor data into three categories: (a) Urgent and Important: data in this category can be processed locally, or is submitted to the cloud, through cellular connections, requesting real-time processing when necessary; (b) Important but Not Urgent: data in this category can be stored locally and sent to the cloud via WiFi when WiFi connections are available; (c) Not Important: data in this category can be discarded. The data in Category (a) is processed via real-time data analytics in the FDACC 10 to determine the urgent actions that are needed, such as to diagnose safety and vehicle malfunctions on the road. The FDACC 10 may keep the data for a short time period, such as a few hours, and then discard the provisional data or send the ultimate data to the cloud. Critical data may be transmitted with redundancy to ensure transmission reliability.

The data in Category (b) is automatously sent to the cloud on a periodic basis via WiFi at home or at work once a user account is set up with car dealers/manufacturers. This data transmission offers a bidirectional high-frequency communication channel between the consumer (driver) and car manufacturers and dealers to transport data used for many functions, including data for preventive/predictive control actions and maintenance, vehicle software upgrade, etc. Data related to the condition of the car include data needed for performing (1) health monitoring for faults or degradation, (2) diagnosis of abnormalities, (3) prognosis of remaining useful life, and (4) notification when maintenance is necessary. Depending on the nature of the application, the FDACC 10 can transmit non-critical data in best effort via only one connection, or in a delay-tolerant fashion, but with guaranteed delivery.

The FDACC 10 can open up wireless connectivity to the car to competition from multiple operators. For example, smart dashboards have in-car Internet radio by teaming up with specific operators. There is no fundamental technical reason why a given dashboard must be dedicated to one operator. Entertainment features (e.g., content distribution) can be made available via WiFi connectivity in the FDACC 10, in the same way that a wireless flash drive (e.g., AIRSTASH) does, so passengers can watch movies/video. The FDACC 10 can be used to offer smart city functions by creating a fog network between cars and other city facilities, such as traffic lights, street lights, surveillance cameras, emergency vehicles, law enforcement vehicles, and other vehicles. Delay-tolerant networking can be used to establish stable communications therein. The FDACC 10 may also offer data services to connect cars with wearables and medical devices (e.g., implanted pacemakers), and offer personalized services. The FDACC 10 may collect a large amount of data, including vehicle conditions and service usage data locally. Further, the servers in the cloud enable car manufacturers/dealers to receive the collected data from cars out on the road. This data can be analyzed, both locally and in the cloud, to gather key insights for many purposes. For example, the data may be analyzed to gain insight to vehicle performance, vehicle diagnostics and performance, optimize marketing and upselling, and help drive revenues and cut costs.

Accordingly, the FDACC provides a two-way communication channel between the consumer (driver) and car manufacturers/dealers in a continuous (or periodic) manner, through either cellular or WiFi connections. This high-frequency channel offers frequent digital touch points and digital service usage. Specifically, the FDACC offers data services ranging from data collection to data processing to data communications, which can be used for a variety of functionalities, including preventive/predictive control actions and maintenance, vehicle software upgrade, optimized marketing, upselling, and making data available to third parties. For instance, the FDACC can tell the consumer minor issues about the car and save the consumers trips to the mechanic. If the issues are major, the FDACC can alarm the consumer to take preventive/predictive control actions and maintenance in an early stage. The FDACC may also provide "data thinning" services by classifying sensory data into different categories, and carry out real-time data analytics when needed, e.g., to diagnose safety issues and vehicle malfunctions.

It should be noted herein that the term "car" is used to denote any type of mobile transportation vehicle that may travel on any type of terrain, in the air, on water, on rails, or any surface configuration. The term "car" is also used to denote any vehicle that can transport people, animals, and/or things.

The features of the present invention which are believed to be novel are set forth below with particularity in the appended claims. However, modifications, variations, and changes to the exemplary embodiments described above will be apparent to those skilled in the art, and the fog data agent for connected cars described herein thus encompasses such modifications, variations, and changes and are not limited to the specific embodiments described herein.

What is claimed is:

1. A fog data agent for a car, comprising:
   a connector configured to couple to an on-board diagnostic port of the car;
   a microprocessor;
   a wireless communication interface coupled to the microprocessor;
   a cellular communication interface coupled to the microprocessor;
   a data storage device coupled to the microprocessor; and
   logic configured to form a fog network via the wireless communication and cellular communication interfaces, receive data from the on-board diagnostic port, where the received data including at least one of tire pressure, engine coolant temperature, engine speed, throttle position, cam position, fuel pressure, fuel level, fuel temperature, air flow, air-fuel radio, hall effect, vehicle speed, airbag, automatic transmission speed, manifold absolute pressure, oil level, oil pressure, spark knock monitoring, oxygen, navigational and GPS, outside temperature, inside temperature, radars, LiDARs (Light Detecting And Ranging), imaging data, analyzes the received data in real-time, and establish a bi-directional communication channel with a remote server via the fog network to transmit at least a subset of the received data to the remote server in response to the data analysis when there is sufficient bandwidth to transmit at least the subset of the received data.

2. The fog data agent of claim 1, wherein the logic is further configured to categorize the data in real-time as "urgent and important," "important but not urgent," and "not important," and establish the bi-directional communication channel with the remote server via at least one of the wireless communication interface and the cellular communication interface to transmit at least the subset of the analyzed data to the remote server in response to the data categories.

3. The fog data agent of claim 1, wherein the logic is further configured to categorize the data in real-time as "urgent and important," "important but not urgent," and "not important," and establish the bi-directional communication channel with the remote server via at least one of the wireless communication interface and the cellular communication interface depending on availability of wireless communication channel to transmit at least the subset of the analyzed data to the remote server in response to the data categories.

4. The fog data agent of claim 1, wherein the logic is further configured to categorize the data in real-time as "urgent and important," "important but not urgent," and "not important," and establish the bi-directional communication channel with the remote server via the cellular communication interface to transmit "urgent and important" data to the remote server.

5. The fog data agent of claim 1, wherein the logic is further configured to categorize the data in real-time as "urgent and important," "important but not urgent," and "not important," store "important but not urgent" data in the data storage device, and establish the bi-directional communication channel with the remote server via the wireless communication interface to transmit "important but not urgent" data to the remote server when WiFi connectivity is available.

6. The fog data agent of claim 1, wherein the logic comprises a dedicated short range communication module enabling data transmission via dedicated short range communications.

7. The fog data agent of claim 1, wherein the logic comprises a WiFi communication module enabling data transmission via WiFi communications.

8. The fog data agent of claim 1, wherein the logic comprises a Bluetooth communication module enabling data transmission via Bluetooth communications.

9. The fog data agent of claim 1, wherein the logic comprises a boosting app enabling bundling of multiple wireless communication channels to achieve higher throughput.

10. The fog data agent of claim 1, wherein the logic comprises a dedicated short range communication module enabling data transmission via dedicated short range communications.

11. The fog data agent of claim 1, wherein the logic comprises wireless communication logic, routing and content distribution logic, sensor data collection and content repository logic, and data processing and visualization logic.

12. A method, comprising:
receiving sensor data from an on-board diagnostic port of a connected car;
analyzing the sensor data in real-time;
determining availability of a wireless and a cellular communication channel;
establishing a fog network via at least one of the wireless and cellular communication channels with a remote server in response to the availability of the wireless communication channel; and
transmitting at least a subset of the analyzed sensor data to the remote server in response to the data analysis when there is sufficient bandwidth to transmit at least the subset of the received data.

13. The method of claim 12, wherein analyzing the data comprises determining critical nature and importance of the sensor data.

14. The method of claim 13, wherein establishing a bi-directional communication channel with the remote server comprises establishing the bi-directional communication channel via at least one of the wireless communication interface and the cellular communication interface to transmit at least the subset of the analyzed sensor data promptly to the remote server in response to the critical nature and importance of the sensor data.

15. The method of claim 12, wherein establishing a bi-directional communication channel with the remote server comprises establishing the bi-directional communication channel via the cellular communication interface to promptly transmit sensor data determined to be "urgent and important" to the remote server.

16. The method of claim 12, wherein establishing a bi-directional communication channel with the remote server comprises establishing the bi-directional communication channel with the remote server via the wireless communication interface to transmit sensor data determined to be "important but not urgent" to the remote server when WiFi connectivity is available.

17. A fog data agent onboard a connected car, comprising:
a connector configured to couple to an on-board diagnostic port of the connected car;
a microprocessor;
a plurality of wireless communication interfaces coupled to the microprocessor;
a cellular communication interface coupled to the microprocessor;
a data storage device coupled to the microprocessor; and
logic executed by the microprocessor configured to form a fog network via the wireless and cellular communication interfaces, receive data from the on-board diagnostic port, analyzes the data in real-time to determine criticality of the received data, and establish a bi-directional communication channel with a remote server via the fog network to transmit at least a subset of the analyzed data to the remote server in response to analyzed criticality of the received data and when there is sufficient bandwidth to transmit at least the subset of the received data.

18. The fog data agent of claim 17, further comprising logic configured to combine bandwidth of the plurality of wireless communication interfaces for transmitting at least the subset of the analyzed data.

19. The fog data agent of claim 17, wherein the logic is further configured to categorize the data in real-time as "urgent and important," "important but not urgent," and "not important," and establish the bi-directional communication channel with the remote server via at least one of the wireless communication interfaces and the cellular communication interface to transmit at least the subset of the analyzed data to the remote server in response to the data categories.

* * * * *